United States Patent [19]

Brauning

[11] 4,056,196
[45] Nov. 1, 1977

[54] SUPPORTING FRAMEWORK FOR SHELVES
[75] Inventor: Egon Brauning, Weil am Rhein, Germany
[73] Assignee: Fehlbaum, Switzerland
[21] Appl. No.: 694,110
[22] Filed: June 8, 1976
[30] Foreign Application Priority Data
June 16, 1975 Switzerland .......................... 7789/75
[51] Int. Cl.² .......................... A47F 5/10; A47B 57/26
[52] U.S. Cl. .................................... 211/207; 211/187; 403/264; 108/109
[58] Field of Search .............. 211/186, 187, 189, 190, 211/191, 192, 206, 195, 207; 248/240, 240.4, 244, 245, 125, 122; 108/106, 107, 108, 109, 144; 52/758 H, 756; 403/323, 254, 255, 348, 353, 264; 312/257 R

[56] References Cited
U.S. PATENT DOCUMENTS

| | | | |
|---|---|---|---|
| 3,730,568 | 5/1973 | Giovannetti | 52/756 X |
| 3,867,048 | 2/1975 | Endzweig | 211/182 X |
| 3,901,612 | 8/1975 | Canin | 403/264 X |
| 3,915,579 | 10/1975 | Offenbroich | 403/264 |
| 3,945,742 | 3/1976 | Condevaux | 403/255 |
| 3,966,340 | 6/1976 | Morris | 403/353 |

Primary Examiner—Roy D. Frazier
Assistant Examiner—Terrell P. Lewis
Attorney, Agent, or Firm—Ladas, Parry, Von Gehr, Goldsmith & Deschamps

[57] ABSTRACT

A supporting framework for shelves including crosspieces which are joined to uprights by locking means which include a locking bolt aligned in the direction of the longitudinal axis of the crosspiece, which bolt includes a head projecting beyond the end of the crosspiece with a contact surface which engages frictionally with a gripping surface on the interior surface of the wall of the upright. The bolt is mounted in a bearing mechanism located within the crosspiece wall so that the bolt can pivot between an unlocked and a locked position, the bolt carrying a collar to which an operating element projecting out through a window in the crosspiece wall is joined. The supporting framework is so designed that when the bolt is in the position the contact surface on the bolt head abuts the gripping surface on the interior surface of the wall of the upright.

2 Claims, 5 Drawing Figures

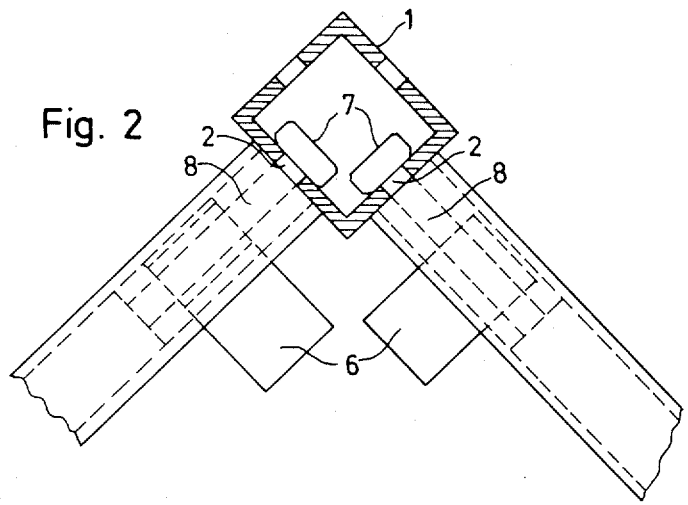
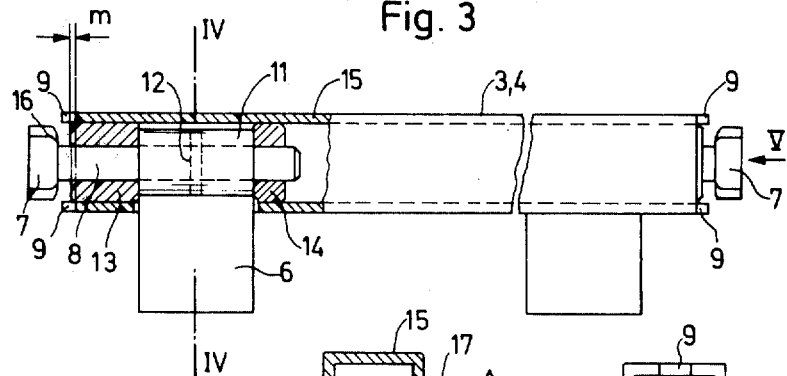
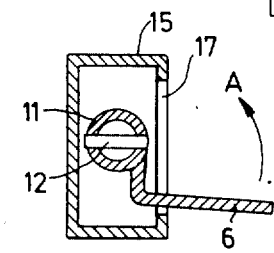

SUPPORTING FRAMEWORK FOR SHELVES

The present invention concerns a shelf supporting framework having crosspieces which slide in longitudinal slots in the uprights of the framework, connect two adjacent uprights and are joined to the uprights by locking means.

When setting up dismantlable supporting frameworks for shelves and so on, it is usual to use screw, locking or pin elements with which two or more framework members can be connected together in such a way that the assembly of framework members forms a stable structure. The term framework members is used in the present context to mean uprights, crosspieces and struts.

Prior art versions of such supporting frameworks in which the fastening elements do not encircle the uprights suffer from the disadvantage either that the vertical position of a crosspiece is dependent on the locations of screw or locking elements mounted at intervals along the uprights or that the vertical position of a crosspiece must correspond to a series of holes into which pins or pegs are placed. If the fastening elements do encircle the uprights, it is in fact possible to adjust a shelf to any vertical position required. But the fact that parts of the screw or locking means project out from the uprights often means that the solution is an aesthetically poor one. Such solutions are undesirable in cases where particular importance is attached to aesthetic considerations.

The aim of the present invention is to propose a shelf supporting framework in which the crsoopieces, preferably designed as shelf carriers, can be fixed at any point required in a vertical slot in an upright in such a way that no parts protrude beyond the surfaces of the uprights.

The supporting framework of the invention, in which the crosspieces are joined to the uprights by locking means, is characterized in that the locking means includes a locking bolt aligned in the direction of the longitudinal axis of the crosspiece, which bolt includes a head projecting beyond the end of the crosspiece with a contact surface which engages frictionally with a gripping surface on the interior surface of the wall of the upright, in that the bolt is mounted in bearing means located within the crosspiece walls so that the bolt can pivot between an unlocked and a locked position, the bolt carrying a collar to which an operating element projecting out through a window in the crosspiece wall is joined, and in that the outer end of the part of the bearing means nearest the bolt head projects a short distance beyond the end of the crosspiece while the inner end of this part of the bearing means abuts the near end of the collar, the whole arrangement being so constructed that when the bolt is in the locked position the contact surface on the bolt head abuts the gripping surface on the interior surface of the wall of the upright, the outer end of the part of the bearing means nearest the bolt head abuts the exterior surface of the upright and said end of the collar abuts the inner end of said part of the bearing means.

An illustrative embodiment of the subject of the invention is described below in conjunction with the accompanying Drawing.

FIG. 2 is a plan view of the arrangement of FIG. 1 showing how the shelves are supported.

FIG. 3 is a shortened representation of a crosspiece, the left-hand end of the crosspiece being shown as a section.

FIGS. 4 and 5 show the two end-sections of the crosspiece of FIG. 3 as a section along the line IV—IV and viewed in the direction of arrow V respectively.

Figure 1:
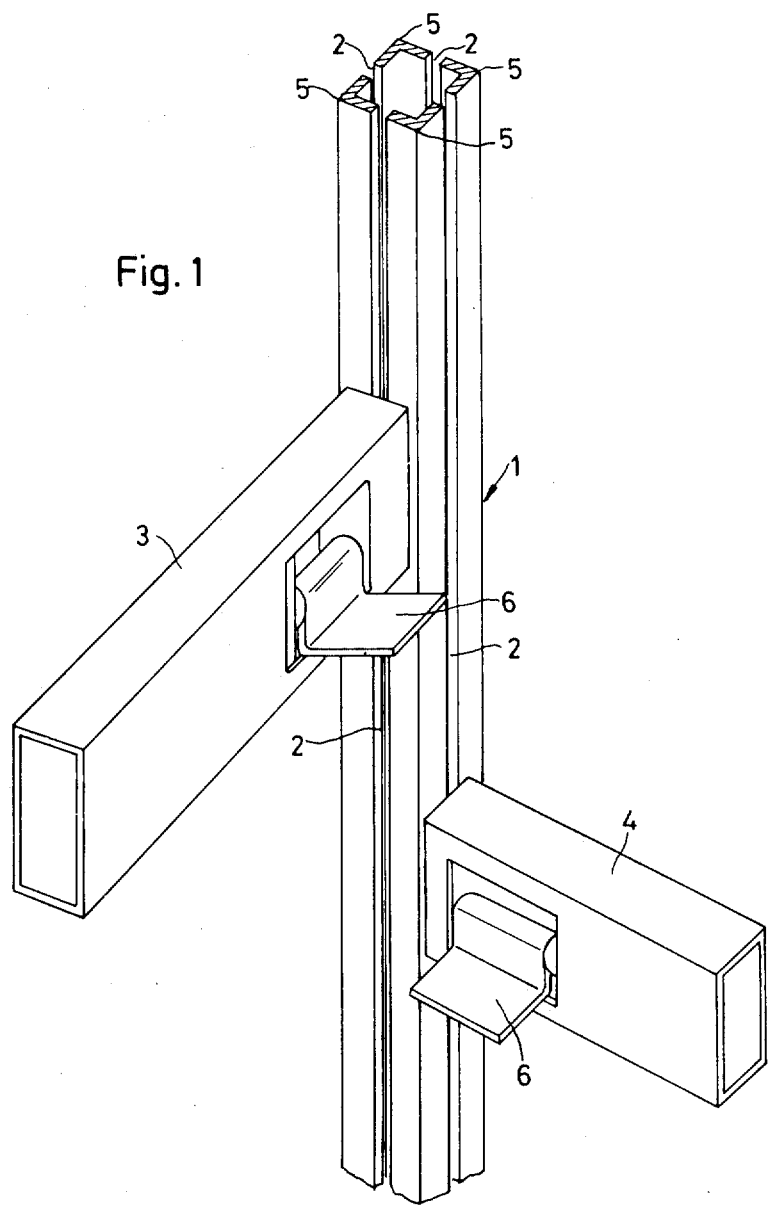
FIG. 1 shows a perspective view of the points where two mutually perpendicular crosspieces situated at different heights are joined to an upright of a supporting framework.

In FIG. 1, reference no. 1 denotes an upright, the upper end of which is shown in cross-section for purpose of clarity. The upright has four slots 2 running along the middle section of its length. Two of these slots hold crosspieces 3, 4. Other upright designs may also be used, in particular one in which the corner or similarly shaped regions 5, 5 are joined to a central bar (not shown). In this case the grooves 2 can extend to the ends of the uprights.

Each of the ends of the crosspieces 3, 4 contains a locking means, the details of which are described later in conjunction with FIG. 3. Only the shelf supporting flap 6 of each locking means is shown in FIG. 1. Two crosspieces disposed at the same height thus possess four supporting flaps on which a shelf or cover plate can rest.

A plan view of the crosspiece arrangement of FIG. 1 is shown in more detail in FIG. 2. Each locking means includes a bolt 8 with a head 7 which lies in the cavity between the walls of the upright 1, the bolt head thus acting as an anchor member for the crosspiece. A locking means is shown in detail in FIG. 3. As can be seen from FIG. 5, the bolt heads are designed as oblong locking bars, the width of which is slightly less than that of a slot 2 to give clearance between the two. When the flap 6 projecting out of the crosspiece is lifted up in the direction indicated by arrow A to close over window 17 in the crosspiece wall (FIG. 4), the bolt head 7 is rotated so that its sides 10 (FIG. 5) finish up lying parallel to the side walls of the crosspiece and in alignment with centering studs 9. In this position (not shown), the bolt head 7 can be pushed together with the centering studs 9 into the required slot 2. By pivoting the flap 6 back down, the bolt head 7 is rotated into its locking position shown in FIGS. 2 and 5.

The flap 6 is joined to a collar 11 which is fastened onto the bolt 8 by means of a pin 12. The bolt is pivotably mounted in a bearing 13 on the bolt head side of the collar 11 and in a bearing 14 on the side of the collar remote from the bolt head. Of these two bearings, at least the one denoted by 13 consists of a resilient rubber material. Both bearings are firmly seated in the space between the crosspiece walls 15. The length of the bearing 13 nearest the bolt head is such that one end of the bearing rests tightly against the collar 11 while the other end projects a short distance m beyond the ends of the crosspiece walls 15. On the side of the bolt head 7 facing the crosspiece there are slightly inclined facets 16 which facilitate rotation of the bolt head inside the upright. When a crosspiece is locked onto an upright 1, the bearing 13 on the bolt head side of the collar 11 is compressed by substantially the distance m by which it projects out beyond the ends of the crosspiece walls 15. The frictional forces which result between the upright and the end of bearing 13 lock the crosspiece firmly in position. The size of the frictional forces depends on the compression m of the bearing material and its hardness. Varying these two parameters allows the contact pressure to be adjusted over a wide range to suit different requirements.

Crosspieces having locking means of the kind described above can therefore be rapidly and securely mounted at any point along a slot in an upright without the need for tools or additional materials. The fact that the operating member of the locking means is designed as a shelf support enables the components of shelf supporting structures to be assembled easily with the means described and allows shelves resting on these support elements to be adjusted to whatever height is required.

I claim:

1. In a shelf supporting framework having hollow crosspieces guided at right angles to the hollow uprights of the framework in longitudinal slots in said uprights, each of said crosspieces connecting two adjacent uprights and having at both ends a locking bolt aligned along the longitudinal axis of the crosspieces and mounted in a bearing element for rotation about and sliding motion along said longitudinal axis, one end of said locking bolt having a head which can be inserted through said slot into the cavity within the upright and which locks the upright and crosspiece together when rotated about 90°, said locking bolt further carrying a blocking element connected to the bolt shaft and accessible via an aperture in the crosspiece wall, said blocking element in the locked position abutting said bearing element and thus urging the bearing element into frictional engagement with the outside surface of the upright, the improvement comprising said blocking element being a collar to which a tab projecting out laterally from the collar through said aperture is attached, said bearing element being made of a resilient elastic material and projecting in its unstressed state a short distance beyond the end of the crosspiece so that when the bolt is in the locked position the bearing element presses tightly against the outside surface of the upright, and centering means being provided at each end of the crosspiece which engage in said slot.

2. The shelf supporting framework as in claim 1, wherein the locked state of the bolt the tab on the collar projects out of the aperture in the crosspiece substantially at right angles to the longitudinal axis of the upright and is designed both as an operating element for the locking bolt and as a shelf carrying flap.

* * * * *